(12) United States Patent
Romer et al.

(10) Patent No.: US 6,267,999 B1
(45) Date of Patent: Jul. 31, 2001

(54) PASTRY DOUGH OR CAKE DECORATING DEVICE

(76) Inventors: Arthur H. Romer, 1118 Orchard Way, Silver Spring, MD (US) 20904; Douglas C. Hicks, 100 Dock Rd., Lewes, DE (US) 19958

( * ) Notice: Subject to any disclaimer, the term of this patent is extended or adjusted under 35 U.S.C. 154(b) by 0 days.

(21) Appl. No.: 09/537,402

(22) Filed: Mar. 29, 2000

(51) Int. Cl.⁷ .............................. A23P 1/00; B05C 5/00; B67B 7/00
(52) U.S. Cl. .......................... 426/115; 118/24; 118/300; 222/1; 222/326; 222/327; 222/387; 222/389; 426/383
(58) Field of Search .............................. 426/87, 115, 383, 426/572; 118/24, 300; 222/1, 326, 327, 386, 387, 389

(56) References Cited

U.S. PATENT DOCUMENTS

| | | |
|---|---|---|
| D. 310,317 | 9/1990 | Broderick et al. . |
| D. 335,069 | 4/1993 | Capellan . |
| 1,753,549 * | 4/1930 | Cates ........................................ 118/24 |
| 2,767,885 | 10/1956 | Miller . |
| 3,057,521 | 10/1962 | Ballard . |
| 3,208,643 | 9/1965 | Phillips . |
| 3,339,524 | 9/1967 | Benz . |
| 3,866,838 | 2/1975 | Miles . |
| 3,921,858 | 11/1975 | Bemm . |
| 4,838,457 | 6/1989 | Swahl et al. . |
| 4,844,917 | 7/1989 | DeLorimiere . |
| 4,961,517 | 10/1990 | Tkac . |
| 5,005,514 | 4/1991 | Verrico . |
| 5,223,245 | 6/1993 | Ibrahim et al. . |
| 5,370,734 | 12/1994 | Ferrero . |
| 5,505,775 | 4/1996 | Kitos . |
| 5,634,574 | 6/1997 | McArthur et al. . |
| 5,826,758 | 10/1998 | McArthur et al. . |
| 5,992,687 * | 11/1999 | Hinds et al. .............................. 222/1 |

OTHER PUBLICATIONS

"Handi–Matic", www.unifiller.com/handy.html, (1999).

* cited by examiner

Primary Examiner—George C. Yeung
(74) Attorney, Agent, or Firm—Jeffrey S. Melcher; Manelli, Denison & Seiter, PLLC

(57) ABSTRACT

Provided is a novel device for dispensing pastry dough, frosting or icing from a cartridge The device has a cartridge container and a hand-held gun. A hydraulic cylinder having a piston is coupled to the cartridge container. The piston acts on a plunger of the cartridge to apply pressure on the pastry dough, frosting or icing to permit the pastry dough, frosting or icing move to the gun to be dispensed. An alternative device utilizes a frosting cylinder in place of the cartridge.

39 Claims, 3 Drawing Sheets

PASTRY DOUGH OR CAKE DECORATING DEVICE

FIELD OF THE INVENTION

The invention relates to a water powered hand-held device for applying pastry dough, frosting or icing. The invention also relates to a method for applying pastry dough, frosting or icing.

BACKGROUND OF THE INVENTION

Decoration of cakes, pastries or the like foodstuffs with an attractive and tasty frosting or icing is a necessary and time consuming task. The preparation thereof frequently results in a significant mess, with spillage and clutter as a consequence of the required mixing containers, food coloring and flavoring bottles. This is especially true on a commercial level when it is desired to prepare frostings of varying colors for differing festive occasions as well as to provide frostings or trim icings of various flavors to complement the cake or pastry.

Frostings and icings having a high viscosity are usually applied using a baker's pastry bag, such as the ones disclosed in U.S. Pat. Nos. 4,961,517, 4,844,917, and Des. 310,317, or with a pastry gun as shown in U.S. Pat. No. Des. 335,069. The pastry bag and the pastry gun require significant force to squeeze the bag or trigger to force high viscosity frosting or icing through shaped nozzles and onto a cake or pastry. When used on a commercial level where numerous cakes and pastries must be coated with frosting and icing, the user's hands may become fatigues thus requiring the user to take rest breaks. Resting due to fatigue can undesirably raise the cost of preparing the cakes and pastries. Furthermore, fatigue can result in unwanted miss-application of the frosting or icing. Thus, there is a need for a device which applies high viscosity frostings and icings that does not require significant human force during application in order to avoid undesirable fatigue.

Forming pastry dough into shapes is similar to forming icing or frosting. Pastry bags have been used to form pastry dough into desired shapes. However, as with icing and frosting, when used on a commercial level where numerous pastries must be formed, fatigue can occur which requires significant amounts of resting. Resting due to fatigue can undesirably raise the cost of preparing the pastries. Therefore, a device which is capable of forming pastries without significant human force is desired.

SUMMARY OF THE INVENTION

An objective of the present invention is to provide a device for applying high viscosity frosting or icing to a pastry dough or cake which does not require significant human force.

Another objective of the present invention is to provide a device for applying high viscosity pastry dough which does not require significant human force.

The above objective and other objectives can be obtained by a device for dispensing pastry dough, frosting or icing from a cartridge containing pastry dough, frosting or icing, the cartridge having a cartridge outlet and a plunger mounted for movement within the cartridge in a direction toward the cartridge outlet, the device comprising:

a cartridge container defining an internal chamber constructed and arranged to contain a cartridge therein;

a hand-held gun having a gun valve and a finger trigger to actuate the gun valve;

a nozzle connected to the gun and comprising a head having a shaped opening;

a hose constructed and arranged to connect a cartridge outlet to the gun;

a hydraulic cylinder coupled to an end of the cartridge container, the hydraulic cylinder comprising:

a walled cylinder having an inside surface;

a piston in sealed slidable contact with the inside surface;

a plunger shaft coupled to the piston on one end and an opposing end of the plunger shaft being constructed and arranged to apply pressure against a plunger of a cartridge when a cartridge is mounted in the cartridge container;

a guide at an end of the walled cylinder in sealed slidable contact with the plunger shaft, an internal volume being defined by the walled cylinder and the guide, the internal volume having an upper volume and a lower volume separated by the piston;

respective liquid passages in the walled cylinder for allowing the passage of liquid to the upper volume and the lower volume; and a liquid supply line for supplying pressurized liquid to the liquid passages.

Another aspect of the invention provides a method of dispensing pastry dough, frosting or icing from a cartridge containing pastry dough, frosting or icing, the cartridge having a cartridge outlet and a plunger mounted for movement in a direction toward the cartridge outlet, the method including:

inserting the cartridge into a cartridge container, coupling one end of a hose to a cartridge outlet, another end of the hose being connected with a hand-held gun having a gun valve, a finger trigger to actuate the gun valve, and a nozzle connected to the gun and having a shaped opening;

coupling a hydraulic cylinder in a removable manner to an end of the cartridge container, the hydraulic cylinder comprising a walled cylinder having an inside surface, a piston in sealed slidable contact with the inside surface, a plunger shaft coupled to the piston on one end and an opposing end of the plunger shaft being constructed and arranged to apply pressure against the plunger of the cartridge, a guide at an end of the walled cylinder in sealed slidable contact with the plunger shaft, an internal volume being defined by the walled cylinder and the guide, the internal volume having an upper volume and a lower volume separated by the piston, respective liquid passages in the walled cylinder for allowing the passage of liquid to the upper volume and the lower volume, and a liquid supply line for supplying pressurized liquid to the liquid;

connecting the liquid supply line to a source of pressurized liquid;

allowing a pressurized liquid to flow into the upper volume to apply pressure against the piston and move piston in a forward direction which moves the plunger shaft to engage the plunger thereby forcing the pastry dough, frosting or icing into the hose; and actuating the finger trigger to permit the pastry dough, frosting or icing to be dispensed from the nozzle.

A further aspect of the invention provides a device for dispensing pastry dough, frosting or icing from a cylinder containing pastry dough, frosting or icing, the device comprising:

a frosting cylinder defining an internal chamber constructed and arranged to contain frosting, pastry dough or icing therein, the frosting cylinder having on an end a frosting outlet;

a hand-held gun having a gun valve and a finger trigger to actuate the gun valve;

a nozzle connected to the gun and comprising a head having a shaped opening;

a hose constructed and arranged to connect the gun to the frosting outlet;

a hydraulic cylinder coupled to an end of the frosting cylinder, the hydraulic cylinder comprising:

a walled cylinder having an inside surface;

a piston in sealed slidable contact with the inside surface;

a plunger shaft coupled to the piston on one end and an opposing end of the plunger shaft being coupled to a plunder which is constructed and arranged to slidably seal against the inner surface of the frosting cylinder;

a guide at an end of the walled cylinder in sealed slidable contact with the plunger shaft, an internal volume being defined by the walled cylinder and the guide, the internal volume having an upper volume and a lower volume separated by the piston;

respective liquid passages in the walled cylinder for allowing the passage of liquid to the upper volume and the lower volume; and a liquid supply line for supplying pressurized liquid to the liquid passages.

Another aspect of the invention provides a method of dispensing pastry dough, frosting or icing from a frosting cylinder comprising:

inserting pastry dough, frosting or icing into a frosting cylinder defining an internal chamber constructed and arranged to contain frosting, pastry dough or icing therein, the frosting cylinder having on an end a frosting outlet;

coupling one end of a hose to the frosting outlet, another end of the hose being connected with a hand-held gun having a gun valve, a finger trigger to actuate the gun valve, and a nozzle connected to the gun and having a shaped opening, coupling a hydraulic cylinder in a removable manner to an end of the frosting cylinder, the hydraulic cylinder comprising a walled cylinder having an inside surface, a piston in sealed slidable contact with the inside surface, a plunger shaft coupled to the piston on one end and an opposing end of the plunger shaft coupled to a plunger constructed and arranged to slidably seal against an inner surface of the frosting cylinder, a guide at an end of the walled cylinder in sealed slidable contact with the plunger shaft, an internal volume being defined by the walled cylinder and the guide, the internal volume having an upper volume and a lower volume separated by the piston, respective liquid passages in the walled cylinder for allowing the passage of liquid to the upper volume and the lower volume, and a liquid supply line for supplying pressurized liquid to the liquid;

connecting the liquid supply line to a source of pressurized liquid;

allowing a pressurized liquid to flow into the upper volume to apply pressure against the piston and move piston in a forward direction which moves the plunger to engage the pastry dough, frosting or icing thereby forcing the pastry dough, frosting or icing into the hose; and actuating the finger trigger to permit the pastry dough, frosting or icing to be dispensed from the nozzle.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

DETAILED DESCRIPTION OF PREFERRED EMBODIMENTS

The complete disclosure of my earlier U.S. patent application Ser. No. 09/129,232, filed on Aug. 5, 1998, now U.S. Pat. No. 6,047,858, is incorporated herein by reference. The invention will now be described with reference to the attached Figures.

Figure 1:
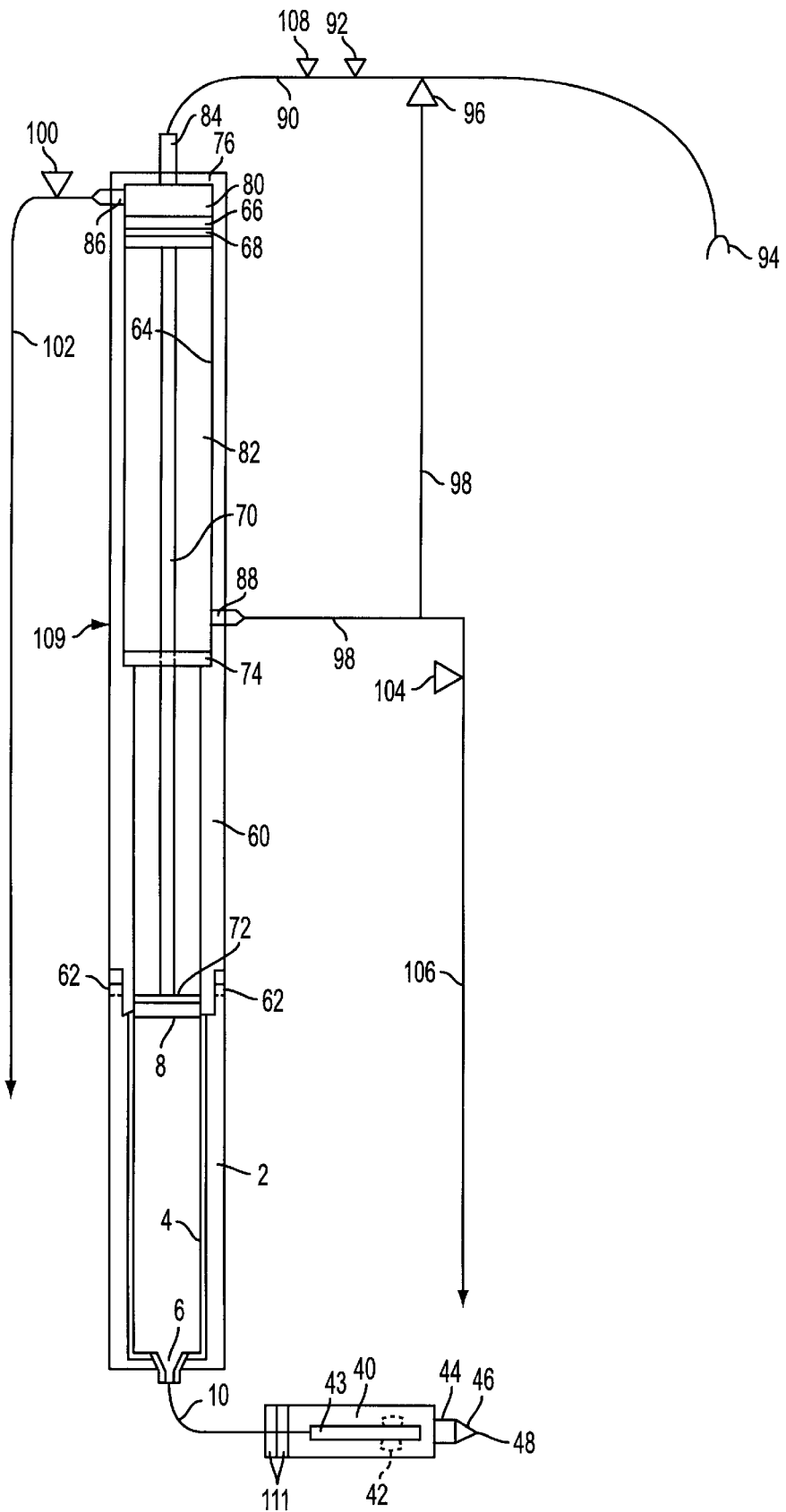
FIG. 1 illustrates a cross-sectional view of device according to the present invention.

With reference to FIG. 1, a device for dispensing the pastry dough, frosting or icing is shown. The device includes a cartridge container 2 defining an internal chamber constructed and arranged to contain a cartridge 4 therein. The cartridge 4 is pre-filled with pastry dough, frosting or icing and has a cartridge outlet 6 at one end thereof and a plunger 8 at the other end of the cartridge 4. The cartridge 4 and plunger 8 are both generally cylindrical with the plunger 8 being mounted in the cartridge 4 for movement in a direction towards the container outlet 6.

A hand-held gun 40 is provided which has a gun valve 43 and a trigger 42 which can be manually actuated to operate the gun valve 43. A nozzle 44 is connected to the gun 40. The nozzle 44 preferably has an interchangeable head 46 having a shaped opening 48 permitting the pastry dough, frosting or icing to be dispensed therefrom in a particular shape. Interchangeable heads of other shapes can be attached to the gun 40. A flexible hose 10 is coupled at one end to the cartridge outlet 6. The other end of the hose 10 is coupled to the gun 40.

A hydraulic cylinder, generally indicated at 60, is removably coupled to the cartridge container 2 to provide pressure on the plunger 8 to cause the pastry dough, frosting or icing to be dispensed from the cartridge 4. In the illustrated embodiment, the hydraulic cylinder 60 is coupled to the cartridge container 2 by a bayonet connection 62. Alternatively, clips, clamps, fasteners or other removable connections can be employed to couple the hydraulic cylinder 60 to the cartridge container 2. The hydraulic cylinder 60 comprises a walled structure having an inner sealing surface 64 and a movable piston 66 having an O-ring 68 which slidably seals the piston 66 to the inner surface 64. The movable piston 66 slides linearly in a forward and a reverse direction. The movable piston 66 is connected to an end of a plunger shaft 70. The other end of the plunger shaft 70 is connected to a plunger plate 72, which is adapted to apply pressure to a plunger 8 of a cartridge 4. An inner volume of the hydraulic cylinder 60 is defined by the inner sealing surface 64, a guide 74 which slidably seals against the plunger shaft 70 and a top wall 76.

The inner volume of the hydraulic cylinder 60 is divided into two parts by the movable piston 66, an upper volume 80 and a lower volume 82. The hydraulic cylinder 60 includes at least one respective liquid passage for each volume 80 and 82. In the present embodiment, the upper volume 80 has separate liquid passages for the liquid inlet 84 and liquid outlet 86, and the lower volume 82 has one liquid passage 88 for use both as a liquid inlet and outlet. The liquid inlet 84 is connected to a hose 90 having a valve 92 for regulating the flow of liquid into the upper volume 80. In the present embodiment, the hose 90 is connected on one end to a water hookup 94 for connecting to a water supply, such as a water faucet. The water hookup 94 can be any water hookup as desired, such as those used on movable dishwashers which hookup to water faucets or outdoor hose hookups. While water is the preferred hydraulic liquid, other suitable hydraulic liquids can be utilized as desired for the particular application.

Hydraulic intensifiers are commonly used in industrial applications to generate high pressure outputs using lower pressure input power sources. The ratio of the piston areas of the input and output pistons in the intensifier determines the increase in pressure they can achieve. These hydraulic intensifiers are commonly employed in high pressure and ultra-high pressure applications and generally operate with hydraulic fluids for the output and hydraulic fluid or pneumatics for the input. To date, none of the these devices have been employed in dispensing high viscosity food-stuffs such as pastry dough or cake frosting. Thus, in the preferred embodiment of the invention shown in FIG. 1, the device makes use of the mechanical advantage supplied by the hydraulic intensifier, generally indicated at 109, to take safe, sanitary and readily available water pressure in everyday commercial and/or residential kitchens and generates a higher force. A hydraulic intensifier can be utilized when the ordinary water pressure or other hydraulic liquid supply is insufficient to dispense a desired pastry dough, frosting or icing. Instead of generating the force needed to dispense the pastry dough, frosting or icing through the use of fatigue producing squeeze bags or mechanical guns, the user simply operates a trigger on the device's gun 40 to control the release of the pressurized material.

In a preferred embodiment, the input side (piston 66) of the intensifier 109 has a piston diameter of 2.90 inches and the output side (plunger plate 72) has a piston diameter of 1.92 inches, giving the system a mechanical advantage of 2.28 to 1.00. When operating with normal line pressure in commercial and/or residential pressure between 40 and 60 psi, the intensifier 109 produces discharge pressures of between 90 and 140 psi. These pressure are sufficient to pump high viscosity material such as pastry dough, frosting or icing.

A pressure regulator 108 can be installed into the inlet feed line or hose 90 to maintain feed pressure to the input piston of the intensifier 109 to a predetermined value. It can be appreciated that the ratio of the piston diameters of the intensifier 109 can be set during the construction of the complete system to produce any desired discharge pressure for a given input pressure.

The intensifier 109 is shown to be incorporated into the hydraulic cylinder 60 via piston 66 and plunger plate 72. It can be appreciated that the intensifier 109 may be separate from the hydraulic cylinder 60.

With reference to FIG. 1, the hose 90 also has a valve 96 connected to a hose 98 which is connected to the liquid passage 88 for regulating the liquid flow to liquid passage 88 and lower volume 82. The liquid outlet 86 is connected to a valve 100 and hose 102 for regulating the flow of liquid from the upper volume 80. The hose 98 also contains a valve 104 connected to a hose 106 for regulating the flow of liquid from the lower volume 82.

Figure 2:
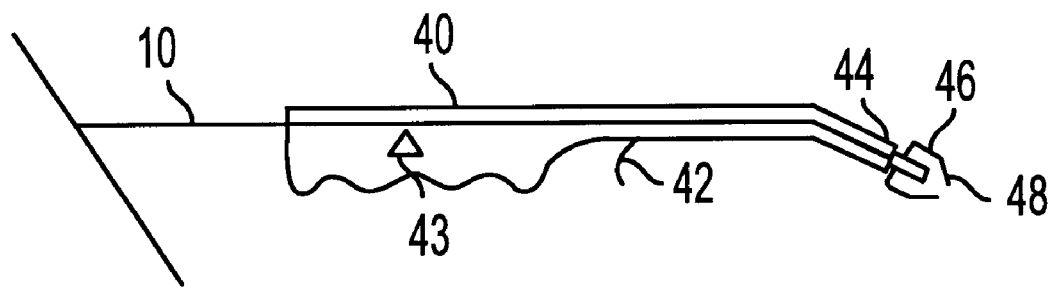
FIG. 2 illustrates a cross-sectional view of the hand-held gun according to the present invention.

FIG. 2 illustrates a cross-sectional views of a hand-held gun 40 for controlling dispensing of the pastry dough, icing or frosting from the device. The hand-held gun 40 is connected to the hose 10. The hose 10 is connected to a gun valve 43 that is activated by the finger trigger 42. The finger trigger 42 opens the gun valve 43 and allows pastry dough, icing or frosting to flow therethrough. Preferably, the gun valve 43 is constructed such that the greater the amount the finger trigger 42 is pulled, the more the gun valve 43 open allowing more pastry dough, frosting or icing to flow therethrough. The gun valve 43 is connected to a nozzle 44. The nozzle 44 are connected to an interchangeable head 46, through which the pastry dough, icing or frosting flows. The interchangeable head 46 can have 8 shaped opening 48 to provide the desired shape of pastry dough, icing or frosting. The interchangeable head 46 works in the same manner as shaped heads on conventional pastry bags. Thus, one skilled in the art will easily be able to provide a head 46 having a shaped opening 48 for the desire shape of pastry dough, icing or frosting.

The cartridge 4 comprises a tubular walled structure having openings on opposite ends and a substantially constant inner diameter. On one end of the cartridge 4, a cartridge outlet 6 is provided. Once the cartridge 4 is filled with the desired material, a plunger 8 is inserted into the cartridge 4. The cartridge 4 operates much like a calking tube. Once pressure is applied to the plunger 8, the plunger 8 is forced further into the cartridge 4, which forces pastry dough, icing or frosting out of the cartridge 4 through the outlet 6.

The desired icing or frosting can be purchased prepackaged in cartridges 1. Alternatively, the desired pastry dough, icing or frosting can be formulated and then inserted in a cartridge 4, followed by inserting the plunder 8. In addition, the device can also be used to form pastry dough. The desired pastry dough can be purchased prepackaged in cartridges 1. Alternatively, the desired pastry dough can be formulated and then inserted in a cartridge 4. followed by inserting the plunder 8.

The device can be operated as follows. The cartridge container 2 is separated from the hydraulic cylinder 60 and a pre-filled cartridge 4 containing pastry dough, frosting or icing is placed in the cartridge container 2. An end of hose 10 is coupled to the cartridge outlet 6. The valve 100 should be opened and the piston 66 moved into the starting position as shown in FIG. 1. The piston 66 can be moved into the starting position by connecting the water hookup 94 to a water supply, dosing the valve 92 and opening the valve 96 which allows water to flow into the lower volume 82 forcing the piston 66 into the starting position. Once the piston 66 is in the starting position, the hydraulic cylinder 60 can be coupled to the cartridge container 2 via the bayonet connection 62. Valves 100 and 96 can the be closed and valves 92 and 104 opened to allow water to flow through the intensifier 109 into the upper volume 80 and water to flow from the lower volume 82. The intensified water flowing into the upper volume 80 forces the piston 66 to move in a forward direction so that the plunger plate 72 engages the plunger 8 to exert pressure on the plunger 8 and force pastry dough, frosting or icing through the hose 10 to the gun 40. The optional pressure regulator 108 can be connected to the hose 90 to maintain feed pressure to the input piston of the intensifier 109 to a predetermined value. Trigger 42 can be selectively actuated to dispense pastry dough, frosting or icing from the nozzle 44 of the gun 40. Shaped heads 46 can easily be interchanged to provide the desired shapes pastry dough, frosting or icing from the opening 48. The speed of the pastry dough, frosting or icing being dispensed can be regulated by how far the trigger 42 is activated and/or the pressure of the liquid in the upper volume 80. In general, the greater the pressure in the upper volume 80 the greater the flow rate, and the farther the trigger 42 is depressed the greater the flow rate. Once the desired amount of pastry dough, frosting or icing has been dispensed from the cartridge 4, the valves 92 and 104 can be closed and the valves 96 and 100 opened to allow water to flow from the upper volume 80 and water to flow into the lower volume 82 thereby moving the piston 66 in a reverse direction and moving the plunger plate 72 out of the cartridge 4. Thereafter, the hydraulic cylinder 60 can be removed from the cartridge container 2 via the bayonet connection 62.

Figure 3:
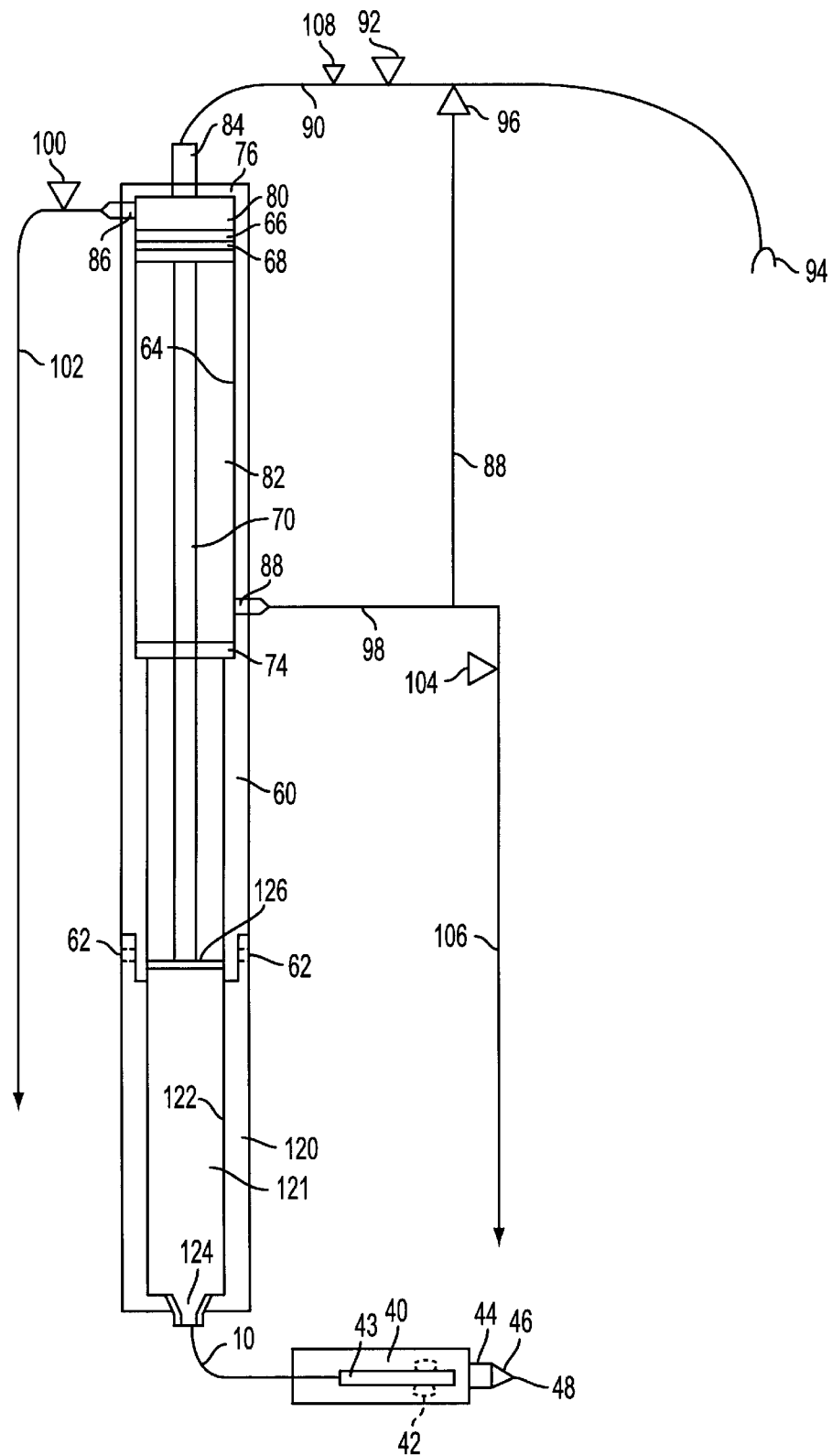
FIG. 3 illustrates an alternative device according to the present invention.

FIG. 3 shows an alternative embodiment in which no cartridge 4 is required. The device employs the hydraulic cylinder 60 and the hand-held gun 40 of Figures. The hydraulic cylinder 60 is connected to an end of the frosting, icing or pastry dough cylinder 120 (hereinafter referred to as the frosting cylinder 12038 ) by a bayonet connection 62. Alternatively, clips, clamps, fasteners or other removable connections can be employed to couple the hydraulic cylinder 60 to the frosting cylinder 120. The frosting cylinder comprises an internal chamber 121, an inner surface 122 and an outlet 124. In place of the plunger plate 72 above, the plunger shaft 70 is connected to a plunger 126 which is constructed and arranged to slidably seal with the inner surface 122. The outlet 124 is connected to the hose 10. The hose 10 is connected to a hand-held gun 40 as described above.

The device can be operated as follows. The frosting cylinder 120 is separated from the hydraulic cylinder 60 and pastry dough, frosting or icing is placed in the internal chamber 121. An end of hose 10 is coupled to the frosting cylinder outlet 124. The valve 100 should be opened and the piston 66 moved into the starting position as shown in FIG. 3. The piston 66 can be moved into the starting position by connecting the water hookup 94 to a water supply, closing the valve 92 and opening the valve 96 which allows water to flow into the lower volume 82 forcing the piston 66 into the starting position. Once the piston 66 is in the starting position, the hydraulic cylinder 60 can be coupled to the frosting cylinder 120 via the bayonet connection 62. Valves 100 and 96 can the be closed and valves 92 and 104 opened to allow water to flow into the upper volume 80 and water to flow from the lower volume 82. The water flowing into the upper volume 80 forces the piston 66 to move in a forward direction so that the plunger 126 exerts pressure on the pastry dough, frosting or icing and forces the pastry dough, frosting or icing through the outlet 124 and hose 10 to the gun 40. An optional pressure regulator 108 can be connected to the hose 90 to adjust the pressure on the plunger 126 by adjusting the water pressure in the upper volume 80. Trigger 42 can be selectively actuated to dispense pastry dough, frosting or icing from the nozzle 44 of the gun 40. Shaped heads 46 can easily be interchanged to provide the desired shapes pastry dough, frosting or icing from the opening 48. The speed of the pastry dough, frosting or icing being dispensed can be regulated by how far the trigger 42 is activated and/or the pressure of the liquid in the upper volume 80. In general, the greater the pressure in the upper volume 80 the greater the flow rate, and the farther the trigger 42 is depressed the greater the flow rate.

Once the desired amount of pastry dough, frosting or icing has been dispensed from the frosting cylinder 120, the valves 92 and 104 can be closed and the valves 96 and 100 opened to allow water to flow from the upper volume 80 and water to flow into the lower volume 82 thereby moving the piston 66 in a reverse direction and moving the plunger 126 out of the frosting cylinder 120. Thereafter, the hydraulic cylinder 60 can be removed from the frosting cylinder 120 via the bayonet connection 62.

The device of the invention is preferably designed to be double-acting, thereby enabling the container 2 to be retractable for easy refilling. An added feature of the device is the capability of incorporating a simple 3-way spool. plug or ball valve to control the dispensing and retraction cycles of the system. A simple plug, ball or spool valve or set of separate plug ball, or spool valves can be used to control the flow of liquid into and out of the system to produce the desired motion of the input and output cylinders.

The connections of the device are preferably swivel and/or bayonet throughout to simplify the use, assembly, disassembly, and the thorough cleaning required for the sanitary handling of food stuffs. More particulary, at least one conventional swivel connection 111 (FIG. 1) is associated With the gun 40 so as to permit the gun 40 to rotate easily with respect to the hose 10. In the illustrated embodiment, two swivel connections are provided so as to prevent tangling of the hose 10 when manipulating the gun 40. The swivel connection may be of the type disclosed in U.S. Pat. No. 4,343,498, the contents of which is hereby incorporated into the preset specification by reference.

The devices of the present invention are suitable for high viscosity materials such as pastry dough, frosting and icing, which do not flow fast or can be sprayed like a liquid. Low viscosity materials, such as many glazes and inks are unsuitable for use in the device described herein since they require a spraying device which is very different from the devices described herein.

While the claimed invention has been described in detail and with reference to specific embodiments thereof. it will be apparent to one of ordinary skill in the art that various changes and modifications can be made to the claimed invention without departing from the spirit and scope thereof.

What is claimed is:

1. A device for dispensing pastry dough, frosting or icing from a cartridge containing pastry dough, frosting or icing, the cartridge having a cartridge outlet and a plunger mounted for movement within the cartridge in a direction toward said cartridge outlet, the device comprising:

a cartridge container defining an internal chamber constructed and arranged to contain a cartridge therein;

a hand-held gun having a gun valve and a finger trigger to actuate said gun valve;

a nozzle connected to said gun and comprising a head having a shaped opening;

a hose constructed and arranged to connect a cartridge outlet to said gun;

a hydraulic cylinder coupled to an end of the cartridge container and constructed and arranged to be pressurized with liquid and thereby force pastry dough, frosting or icing to the gun; and a liquid supply line for supplying liquid to said hydraulic cylinder.

2. A device according to claim 1, wherein the hydraulic cylinder comprises:
a walled cylinder having an inside surface;
a piston in sealed slidable contact with said inside surface;
a plunger shaft coupled to the piston on one end and an opposing end of said plunger shaft being constructed and arranged to apply pressure against a plunger of a cartridge when a cartridge is mounted in said cartridge container;
a guide at an end of said walled cylinder in sealed slidable contact with said plunger shaft, an internal volume being defined by said walled cylinder and said guide, said internal volume having an upper volume and a lower volume separated by said piston;
respective liquid passages in said walled cylinder for allowing the passage of liquid to said upper volume and said lower volume;
said liquid supply line supplying pressurized liquid to said liquid passages.

3. A device according to claim 2, wherein when a cartridge containing pastry dough, frosting or icing is disposed in the cartridge container and the cartridge outlet is connected with the hose and the hydraulic cylinder is pressurized with a liquid, the piston moves the shaft in the direction of the plunger and the shaft engages the plunger thereby forcing pastry dough, frosting or icing to the gun when actuation of the finger trigger permits the pastry dough, frosting or icing to be dispensed from the nozzle.

4. A device according to claim 1, wherein said head having a shaped opening is removable.

5. A device according to claim 2, wherein each of said upper and lower volume has one respective liquid passage.

6. A device according to claim 2, wherein said upper volume has two liquid passages.

7. A device according to claim 2, further comprising at least one valve for regulating the flow of liquid through a liquid passage for said upper volume.

8. A device according to claim 2, further comprising at least one valve for regulating the flow liquid through a liquid passage for said lower volume.

9. A device according to claim 2, further comprising a plunger plate connected to an end of said plunger shaft, wherein said plunger plate is constructed and arranged to contact a plunger of a cartridge.

10. A device according to claim 2, wherein said piston comprises an o-ring seal for slidably sealing said piston with said inner surface of said walled cylinder.

11. A device according to claim 2, wherein said liquid supply line further comprises a bypass valve.

12. A device according to claim 2, wherein said liquid supply line further comprises a regulator for regulating the liquid pressure supplied to said internal volume.

13. A device according to claim 2, wherein said liquid supply line further comprises a water hookup for connecting to source of pressurized water.

14. A device according to claim 2, wherein said liquid supply line further comprises a faucet hookup for connecting to water faucets.

15. A device according to claim 1, in combination with a cartridge containing pastry dough, frosting or icing, the cartridge having a container outlet and plunger structure mounted for movement in a direction toward said cartridge outlet.

16. A device according to claim 1, wherein said hydraulic cylinder is removably coupled to an end of the cartridge container.

17. A device according to claim 1, further including a hydraulic intensifier communicating with said supply line to receive supply line pressure and increase the supply line pressure to a pressure above supply line pressure, with the increased pressure being applied to the cartridge container.

18. A device according to claim 1, further comprising at least one swivel connection associated with said gun and said hose to permit said gun to rotate with respect to said hose.

19. A method of dispensing pastry dough, frosting or icing from a cartridge containing pastry dough, frosting or icing, the cartridge having a cartridge outlet and a plunger mounted for movement in a direction toward said cartridge outlet, the method including:
inserting the cartridge into a cartridge container;
coupling one end of a hose to a cartridge outlet, another end of said hose being connected with a hand-held gun having a gun valve, a finger trigger to actuate the gun valve, and a nozzle connected to the gun and having a shaped opening;
coupling a hydraulic cylinder in a removable manner to an end of said cartridge container, said hydraulic cylinder comprising a walled cylinder having an inside surface, a piston in sealed slidable contact with said inside surface, a plunger shaft coupled to the piston on one end and an opposing end of said plunger shaft being constructed and arranged to apply pressure against said plunger of said cartridge, a guide at an end of said walled cylinder in sealed slidable contact with said plunger shaft, an internal volume being defined by said walled cylinder and said guide, said internal volume having an upper volume and a lower volume separated by said piston, respective liquid passages in said walled cylinder for allowing the passage of liquid to said upper volume and said lower volume, and a liquid supply line for supplying pressurized liquid to said liquid passages;
connecting said liquid supply line to a source of pressurized liquid;
allowing a pressurized liquid to flow into said upper volume to apply pressure against said piston and move the piston in a forward direction which moves the plunger shaft to engage the plunger thereby forcing the pastry dough, frosting or icing into the hose; and
actuating said finger trigger to permit the pastry dough, frosting or icing to be dispensed from the nozzle.

20. A method according to claim 19, further including:
reversing operation of said hydraulic cylinder to cause said piston to move in a the reverse direction by allowing pressurized liquid to flow into said lower volume and liquid to flow from said upper volume through said respective liquid passages;
removing said hydraulic cylinder from said cartridge container: and
removing said cartridge from said cartridge container.

21. A method according to claim 19, wherein the pressurized liquid in said supply line is intensified via an intensifier to be at a pressure greater than pressure at the source.

22. A device for dispensing pastry dough, frosting or icing from a cylinder containing pastry dough, frosting or icing, the device comprising:
a frosting cylinder defining an internal chamber constructed and arranged to contain frosting, pasty dough or icing therein, said frosting cylinder having a frosting outlet at an end thereof;

a hand-held gun having a gun valve and a finger trigger to actuate said gun valve;

a nozzle connected to said gun and comprising a head having a shaped opening;

a hose constructed and arranged to connect said gun to said frosting outlet;

a hydraulic cylinder coupled to an end of the frosting cylinder, the hydraulic cylinder comprising:

a walled cylinder having an inside surface;

a piston in sealed slidable contact with said inside surface;

a plunger shaft coupled to the piston on one end and an opposing end of said plunger shaft being coupled to a plunger which is constructed and arranged to slidably seal against said inner surface of said frosting cylinder;

a guide at an end of said walled cylinder in sealed slidable contact with said plunger shaft, an internal volume being defined by said walled cylinder and said guide, said internal volume having an upper volume and a lower volume separated by said piston;

respective liquid passages in said walled cylinder for allowing the passage of liquid to said upper volume and said lower volume; and a liquid supply line for supplying pressurized liquid to said liquid passages.

23. A device according to claim 22, wherein when pastry dough, frosting or icing is disposed in the inner chamber and the frosting outlet is connected with the hose and the hydraulic cylinder is pressurized with a liquid, the piston moves the shaft in the direction of the inner chamber and the plunger applies pressure to the pastry dough, frosting or icing, thereby forcing pastry dough, frosting or icing to the gun when actuation of the finger trigger permits the pastry dough, frosting or icing to be dispensed from the nozzle.

24. A device according to claim 22, wherein said head having a shaped opening is removable.

25. A device according to claim 22, wherein each of said upper and lower volume has one respective liquid passage.

26. A device according to claim 22, wherein said upper volume has two liquid passages.

27. A device according to claim 22, further comprising at least one valve for regulating the flow of liquid through a liquid passage for said upper volume.

28. A device according to claim 22, further comprising at least one valve for regulating the flow liquid through a liquid passage for said lower volume.

29. A device according to claim 22, wherein said piston comprises an o-ring seal for slidably sealing said piston with said inner surface of said walled cylinder.

30. A device according to claim 22, wherein said liquid supply line further comprises a bypass valve.

31. A device according to claim 22, wherein said liquid supply line further comprises a regulator for regulating the liquid pressure supplied to said internal volume.

32. A device according to claim 22, wherein said liquid supply line further comprises a water hookup for connecting to source of pressurized water.

33. A device according to claim 22, wherein said liquid supply line further comprises a faucet hookup for connecting to water faucets.

34. A device according to claim 22, wherein said hydraulic cylinder is removably coupled to said frosting cylinder.

35. A device according to claim 22, further comprising a hydraulic intensifier communicating with said supply line to receive supply line pressure and increase the supply line pressure to a pressure above supply line pressure, with the increased pressure being received by said hydraulic cylinder.

36. A device according to claim 22, further comprising at least one swivel connection associated with said gun and said hose to permit said gun to rotate with respect to said hose.

37. A method of dispensing pastry dough, frosting or icing from a frosting cylinder comprising:

inserting pastry dough, frosting or icing into a frosting cylinder defining an internal chamber constructed and arranged to contain frosting, pastry dough or icing therein, said frosting cylinder having on an end a frosting outlet;

coupling one end of a hose to said frosting outlet, another end of said hose being connected with a hand-held gun having a gun valve, a finger trigger to actuate the gun valve, and a nozzle connected to the gun and having a shaped opening, coupling a hydraulic cylinder in a removable manner to an end of said frosting cylinder, said hydraulic cylinder comprising a walled cylinder having an inside surface, a piston in sealed slidable contact with said inside surface, a plunger shaft coupled to the piston on one end and an opposing end of said plunger shaft coupled to a plunger constructed and arranged to slidably seal against an inner surface of said frosting cylinder, a guide at an end of said walled cylinder in sealed slidable contact with said plunger shaft, an internal volume being defined by said walled cylinder and said guide, said internal volume having an upper volume and a lower volume separated by said piston, respective liquid passages in said walled cylinder for allowing the passage of liquid to said upper volume and said lower volume, and a liquid supply line for supplying pressurized liquid to said liquid passages;

connecting said liquid supply line to a source of pressurized liquid;

allowing a pressurized liquid to flow into said upper volume to apply pressure against said piston and move piston in a forward direction which moves the plunger to engage the pastry dough, frosting or icing thereby forcing the pastry dough, frosting or icing into the hose; and actuating said finger trigger to permit the pastry dough, frosting or icing to be dispensed from the nozzle.

38. A method according to claim 37, further including:

reversing operation of said hydraulic cylinder to cause said piston to move in a the reverse direction by allowing pressurized liquid to flow into said lower volume and liquid to flow from said upper volume through said respective liquid passages; and removing said hydraulic cylinder from said frosting cylinder.

39. A method according to claim 37, wherein the pressurized liquid in said supply line is intensified via an intensifier to be at a pressure greater than pressure at the source.

* * * * *